May 31, 1932.    J. P. REMINGTON    1,860,904
PRESSURE GAUGE
Filed Aug. 31, 1927
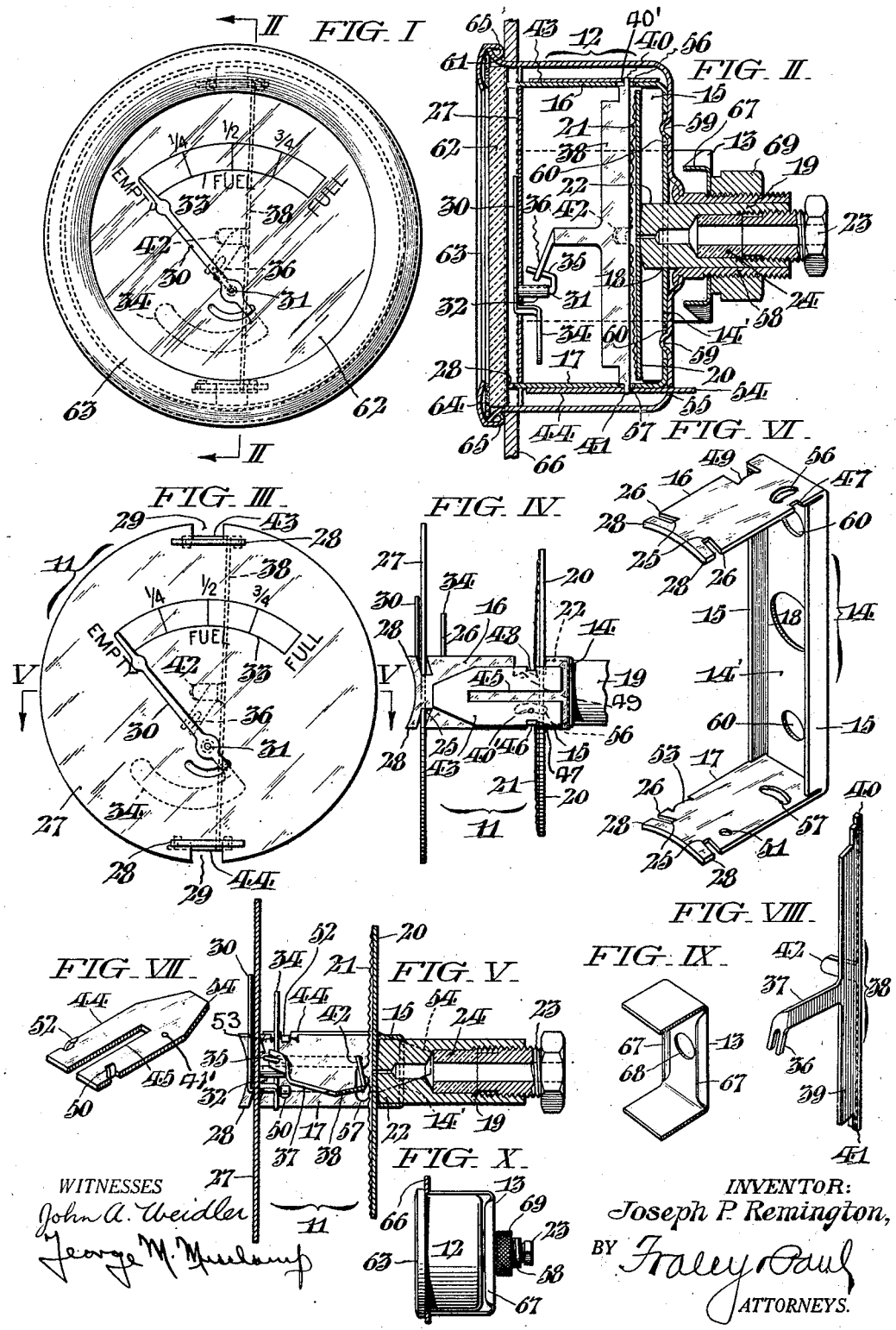
INVENTOR:
Joseph P. Remington,
BY Foley Paul
ATTORNEYS.

Patented May 31, 1932

1,860,904

UNITED STATES PATENT OFFICE

JOSEPH P. REMINGTON, OF PHILADELPHIA, PENNSYLVANIA

PRESSURE GAUGE

Application filed August 31, 1927. Serial No. 216,717.

This invention has reference to pressure gauges and, more particularly, to that type generally classified as low pressure-indicating instruments useful for showing the liquid level in gasoline tanks of automobiles and the like. Instruments of the character referred to usually employ a trapped head of air or gas as the pressure responsive measuring medium and involve intricate adjustments to accommodate them to differing depths of supply tanks.

It is customary with automotive engineers to locate the feed pipe, which conducts gasoline to the carbureter of an internal combustion motor, so that it terminates an inch or so above the actual bottom of the supply tank. Hence, any "residue" remaining in the tank—which may contain water and sediment—can not be drawn up into the carbureter, while the instrument-board gasoline-gauge indicates "Empty" when no more gasoline is available to be drawn up into the carbureter, or, in other words, when the level has fallen to the bottom of the fuel line instead of to the actual bottom of the supply tank.

In order not to indicate the residue in the tank it is, obviously, necessary to initially set the indicating pointer a certain distance away from—or in advance of—the "Empty" marking, and, in order to accomplish this end I find, that, on account of wide variation in the amount of residue possible in different supply tanks, such initial setting is not always accurately effected at the factory, with the attendant disadvantage such instruments need further adjustment when fitted in operative location.

Accordingly, the primary object of my present invention is to provide a gauge of the typified character embodying means whereby the noted adjustments, both initial—and secondary when necessary—can be readily effected to accommodate varying depths of supply tanks, as well as effectively preventing it from indicating the presence of un-useable residue in the supply tank.

With the just recited and other objects in view, as well as the attainment of greater simplicity in construction and ease of assembly, my novel pressure gauge mainly embodies a noncomplex frame structure with an operating means consisting of a rock element mounted between shiftable bearings, one of which permits its leverage to be shortened or lengthened for depth of tank adjustment; while the other bearing is designed to permit movement of said rock element toward or away from the gauge diaphragm so as to accommodate varying amounts of residue. Incidentally this latter adjustment also takes care of manufacturing irregularities such as incorrect dish in the gauge diaphragm, as well as other—not easily controlled—irregularities incident to inexact assembly.

Numerous other objects and advantages of the present invention will be manifest as it is better understood from the following detailed explanation, which when considered in conjunction with the accompanying drawings illustrates a practical embodiment thereof; while the appended claims serve to clearly define those features alleged as novel and, therefore, constituting patentable subject-matter.

In the drawings:—

Fig. I is a face view of a low pressure gauge embodying the present improvements.

Fig. II is a sectional view of the same, taken as indicated by the arrows II—II in Fig. I.

Fig. III is a detail face view of the gauge assembly removed from the enclosure casing.

Fig. IV is a plan view of the same.

Fig. V is a sectional view, taken as indicated by the arrows V—V in Fig. III.

Fig. VI is a perspective view of the gauge frame member whereby the various working parts are supported as a compact body.

Fig. VII is a perspective view of a regulator element, hereinafter particularly described.

Fig. VIII is a perspective view of the gauge operating lever.

Fig. IX is a perspective view of a clamping device, later on again referred to; and, Fig. X is a smaller-scale illustration of my novel gauge attached to a fragmentary portion of an instrument board.

Referring more in detail to the drawings my novel pressure gauge embodies two main components, namely the gauge assembly comprehensively designated 11, and the casing similarly characterized 12; with an auxiliary component or clamping device, generally indicated by the reference index 13. The gauge assembly 11 comprises a mounting member or frame 14—Fig. VI—preferably formed, as a sheet metal stamping, to provide a vertical portion 14', having lateral or side flanges 15, with upper and lower horizontal flange portions 16, 17, respectively; while the vertical portion 14' aforesaid is provided with a central aperture 18 affording bearing for the tubular shank 19 of an appropriate aneroid disk 20 having a corrugated diaphragm 21, adapted to be influenced by fluid pressure from within. Rotation of the aneroid disk 20 relative to the mounting member vertical 14' is effectively prevented by a headed portion 22 thereof snugly fitting between the side flanges 15, while the fluid pressure used as the measuring medium is conducted to the aneroid disk 20 through an appropriate coupler nipple 23 engaging the screw-threaded bore of the shank 19; a compressible tubular packing 24 being fitted in said shank to ensure a fluid tight joint between the connected parts.

Referring again to the mounting member or frame 14 it will be seen that the free ends of the flange portions 16, 17 are provided with opposed inwardly-converging slots 25, that afford bearing spurs 26 for the gauge dial 27, and co-planar arcuate tongues or spacers 28, which are adapted for compression into clamping engagement upon the face of said dial, as later on explained. Incidentally, it is noteworthy that this manner of securing the dial 27 in place, effectively prevents assembly fracture when said dial is closed in—or covered in with a superposed glass or crystal, by affording relatively spaced supporting points therefor and by distributing the clamping pressure, as will be later on further explained. Furthermore, the dial 27 is provided with diametrically opposed cut-out 29, that facilitate quick assembly by snapping said dial between the flanges 16, 17 of the mounting frame 14, as well as correctly positioning the same relative to such mounting member or frame. The arcuate tongues or spacers 28 also serve to accommodate glasses or crystals of varied thickness, as will be obvious.

The indicating pointer 30 of the gauge is fixed to an arbor 31 freely journaled in a tubular offset 32 on the dial 27, and it is arranged to swing over a co-ordinating arcuate scale 33, provided with sub-divisions to indicate the contents of the supply tank by quarter stages. This pointer 30 is provided with a counterweight 34, while the inner end of the arbor 31 is cranked or bent at 35, for co-operative engagement by the forked portion 36 of an angled arm 37, integral with the gauge actuator-lever or rock-element, comprehensively designated 38, and shown to best advantage in Fig. VIII. The actuator-lever or rock element 38 is preferably a sheet metal stamping embodying a main or body bar 39 having joggled ends affording pintles 40, 41, while the integral angled arm 37 above referred to is located midway between the bar ends with the major extent thereof co-planar to said bar 39. Conveniently, although not essentially, opposed to the angled arm 37, is a tongue 42 integral with the body bar 39—angled with respect to the plane thereof—adapted to be positioned adjacent, and subject to actuation by, the central portion or button of the aneroid diaphragm 21, as later on explained. The actuator-lever 38 is normally positioned—in the gauge—substantially vertical and it is supported by journal openings 40', 41' afforded the pintles 40, 41, in upper and lower rock levers 43, 44, respectively. These rock levers 43, 44 are, preferably, slotted longitudinally at 45—as best shown in Fig. VII—to increase frictional engagement with the parts 16, 17 of the frame 14, while the former or upper one 43 is pivoted to the mounting frame flange 16 by means of a claw 46 engaging in and clampingly below a notch 47 in said flange; whereas movement of the rock lever 43 is limited by an opposed claw 48 similarly cooperating with a relatively wider curved notch 49 in said flange 16, as clearly understandable upon an examination of Figs. IV and VI, more particularly. Attention is directed to the fact that the upper rock lever 43 is pivoted adjacent the inner end of the flange 16, and that it is also of a length not to project beyond the confines of the dial 27 and mounting frame vertical portion 14', said lever serving to control the position of the actuator tongue 42 relative to the diaphragm spot projection—or center button—so that the gauge pointer 30 will not begin to register until after said diaphragm has initially distended sufficient to accommodate the un-usable residue in the supply tank.

On the other hand, the lower rock lever 44 is similarly pivoted to the mounting frame flange 17 by means of a claw 50 engaging in a hole 51, provided for the purpose in said flange adjacent its outer end; whereas movement of this rock lever 44 is limited by an opposed claw 52 likewise cooperating with a curved notch 53 in the flange 17, in a manner similar to that described in the preceding paragraph in connection with the upper rock lever 43. Attention is, however, particularly directed to the fact that the rock lever 44 is rearwardly extended so as to provide a manipulator end 54 which projects through a slot 55—Fig. II—in the casing 12, for a purpose hereafter set forth. Elongated arcuate slots 56, 57 are formed in the upper and lower mounting frame flanges 16, 17—at right angles to one another—for free passage and guidance of the actuator-lever or rock-element 38 in effecting certain gauge adjustments, hereafter noted.

Having described the gauge assembly 11, per se, I will now explain the manner of its attachment in the casing 12. This casing 12 is made of sheet metal of cup formation with an attached tubular stem 58, adapted to snugly receive the aneroid shank 19 previous to application thereto of the coupler nipple 23. Proper positional placement of the gauge assembly 11 in the casing 12 is obtained by means of spot projections 59—stamped up from the casing bottom—engaging in holes 60 provided for the purpose in the vertical portion 14', of the mounting frame 14; while said casing is formed also with an outwardly flaring lip 61. After the assembled unit 11 is inserted in the casing 12, the latter is closed-in by means of a glass or crystal 62, superposed on the tongues 28—hereinbefore referred to—in spacial relation to the dial 27, whereupon the margin of said glass or crystal is overlapped by a retainer ring 63 with interposition of a suitable flexible gasket 64. This retainer ring is now "burred" or turned over—as indicated at 65—into firm clamping engagement at the back of the casing lip 61, whereby the parts 11, 12 are permanently and rigidly secured together.

As a convenient means for attaching the gauge to the instrument board 66—Fig. X—of an automobile for example, I make use of the clamping device 13, shown in detail by Fig. IX. This clamping device 13, is preferably a sheet-metal bridge-section stamping, having the web or intermediate portion reinforced by lateral stiffener flanges 67, and it is medially apertured at 68 for free passage over the externally screw-threaded tubular stem 58, fixture in place being obtained by means of a nut 69, for an obvious manner.

From the foregoing description it will be apparent that the actuator-lever or rock-element 38, upon which the aneroid diaphragm 21 operates, is fashioned and configured so that when the upper rock lever 43 is initially "set" the gauge will begin to indicate at the proper point. On the other hand it is possible to shift the lower rock lever 44 from one extreme position to the other without moving the pointer 30 from the "Empty" position; inasmuch as no matter what difference there be in the depth between any two tanks, the pointer 30 should always indicate "Empty" when both tanks are empty. It will also be noted that by my invention I have provided an effective means to accomplish the just recited desiderata, inasmuch as the shifting of the actuator-lever bearings 40, 41—by means of the rock levers 43, 44, respectively—causes the actuator-lever 38 to rotate in one instance, when the lever 44 is moved, about a conical axis; and, in the other case, when the lever 43 is moved, the actuator lever 38 is swung arcuately away from the button of the diaphragm 21 in a substantially diametric direction. Or, in other words, the actuator-lever or bar 38 is afforded capacity for circumferential movement in two directions, respectively at substantially right angles to one another, with one of said movements conical relative to a shiftable focal point.

Finally it is thought my novel type of pressure gauge will be fully understood from the foregoing description, although it is manifest this invention—in its generic aspects—is likewise capable of various modifications and ready adaptation to other forms of gauges than that specifically typified. However, it is asserted that all such other embodiments and uses of the invention as may come within the terms of the appended claims are believed to be within the spirit and contemplation of said invention.

Having described my invention, what I claim is:—

1. A gauge comprising a pivotal pointer, a graduated dial overtravelled by the pointer, an arbor for the pointer having a cranked end portion, an aneroid disk device, an actuator having a tongue engageable by the disk device and an arm co-ordinated with the arbor cranked end portion, and said actuator being journaled between bearing elements respectively capable of independent rotative movement to effect conoidal adjustment of the actuator in restricting the pointer travel to the dial limits.

2. A gauge comprising a pivotal pointer, a graduated dial overtravelled by the pointer, an arbor for the pointer having a cranked end portion, an aneroid device with a diaphragm adapted to be influenced by pressure, an actuator having a tongue engageable by the diaphragm and an angle arm co-ordinated with the arbor cranked end portion, and pivotal bearing members affording free journal support for the actuator, one of which is movable to arcuately swing the actuator to or away from the diaphragm center, and the other movable to vary the journal axis of the actuator conoidally with respect thereto.

3. A gauge comprising a pivotal pointer, a dial with a graduated scale over which the pointer moves, an arbor for the pointer having a cranked end portion, an aneroid disk with a diaphragm responsive to pressure from within, an actuator directly co-ordinating the aneroid disk diaphragm with the arbor cranked end portion to actuate the pointer in one direction, pivotally mounted bearing elements between which the actuator is journaled, said elements being movable in differing circumgyratory directions, and means affording support for the aforesaid parts as an operative unit.

4. A gauge comprising a pivotal pointer, a graduated dial over which the pointer moves, an arbor for the pointer having a cranked end portion, pressure responsive means, pivotally mounted bearing elements, and an actuator journaled in said pivotally mounted bearing elements adapted for differential movement, said actuator consisting of a sheet-metal bar member having pintle ends with a tongue at an angle to the plane thereof for repose co-axial of the pressure-responsive means and an arm co-planar with said bar having an angled end for co-ordination to the arbor cranked end portion aforesaid.

5. A gauge comprising a pivotal pointer, a dial with a graduated scale over which the pointer moves, an arbor for the pointer having a cranked end portion, a pressure-responsive device, an actuator, pivotal bearing elements for the actuator enabling differential adjustment thereof, said actuator co-ordinating the pressure-responsive device with the arbor cranked end portion to effect movement of the pointer in one direction, and a mounting member whereby these various parts are supported as an operative assemblage, said member being in the form of a sheet metal stamping having an intermediate portion of channel cross-section with terminal flanges in parallel, said channel section sustaining the pressure-responsive device, and the parallel flanges having means for attaching the dial in place as well as affording pivotal support for the bearings aforesaid.

6. A gauge comprising a pivotal pointer, a dial with a graduated scale over which the pointer moves, an arbor for the pointer having a cranked end portion, a pressure-responsive device, an actuator, pivotal bearing levers for the actuator enabling differential adjustment thereof, said actuator directly co-ordinating the pressure-responsive device with the arbor cranked end portion to effect movement of the pointer in one direction, and an assembly mounting for these parts embodying an intermediate portion of channel cross-section with flat terminal portions in parallel, the intermediate portion having an orifice to receive and sustain a headed shank of the pressure-responsive device, and the flat terminal portions having opposed slots affording attaching means for the dial as well as pivotal connection for the actuator bearings aforesaid.

7. A gauge comprising a pivotal pointer, a dial with a graduated scale over which the pointer moves, an arbor for the pointer having a cranked end portion, a pressure-responsive device, an actuator with pintle ends, pivotal bearing levers for the actuator pintle ends enabling differential adjustment thereof, said actuator directly co-ordinating the pressure-responsive device with the arbor cranked end portion to effect movement of the pointer in one direction, and an assembly mounting for these parts embodying an intermediate portion of channel cross-section with flat terminal portions in parallel, the intermediate portion having an orifice to receive and sustain a headed shank of the pressure-responsive device, and the flat terminal portions having opposed inwardly converging cut-outs positionally seating the dial with co-planar arcuate tongues gripping the face thereof, one of the flanges being provided with differential notches adjacent its inner end for pivotal attachment of one of the actuator bearings, and the other of said flanges having similar means adjacent its outer end for connection of the other actuator bearing.

8. A gauge comprising a pivotal pointer, a dial with a graduated scale over which the pointer moves, an arbor for the pointer, an aneroid disk, an actuator, bearing members for the actuator having capacity for differential adjustment, said actuator directly co-ordinating the aneroid disk with the pointer arbor to affect movement thereof in one direction, a mounting frame affording pivotal support for the bearing members in which the foregoing parts are arranged as a co-operative assemblage, said frame having projecting arcuate tongues, a casing adapted to receive the assemblage and having a flaring lip, a crystal afforded support by the arcuate tongues in spacial relation to the gauge dial, and a retainer ring marginally lapping the crystal with a peripheral portion brought into clamping engagement at the back of the casing lip whereby the assemblage is permanently enclosed in the casing.

9. A gauge comprising a pivotal pointer, a dial with a graduated scale over which the pointer moves, an arbor for the pointer, an aneroid disk, an actuator, bearing members for said actuator having capacity for differential adjustment, said actuator directly co-ordinating the aneroid disk with the pointer arbor to affect movement thereof in one direction, a mounting frame affording pivotal support for the bearing members in which the foregoing parts are arranged as a co-operative assemblage, said frame having projecting arcuate tongues, a casing adapted to receive the assemblage and having a flaring lip, a crystal afforded support by the arcuate tongues in spacial relation to the gauge dial, a retainer ring marginally lapping the crystal and gripping the casing lip to permanently secure the assemblage together, and spot projections in the casing entering apertures in the mounting frame to prevent relative rotation between the assembled parts.

10. A gauge comprising a pivotal pointer, a dial with a graduated scale over which the pointer moves, an arbor for the pointer, an aneroid disk, an actuator, bearing members for the actuator having capacity for differential adjustment, said actuator directly co-ordinating the aneroid disk with the pointer arbor to effect movement of the latter in one direction, a mounting frame embodying upper and lower flanges affording pivotal support for the bearing members and in which the aforesaid parts are arranged in co-operative assemblage, said frame embodying lateral projecting tongues, a casing to receive the assemblage as a whole and having a flaring lip, a crystal supported by the projecting tongues in spaced relation to the gauge dial, a retainer ring marginally lapping the crystal and gripping the casing lip to secure the assemblage together. the aforesaid projecting tongues accommodating variations in thickness of the crystal, and means in the casing co-operative with the mounting frame to prevent relative rotation between the assembled parts.

11. A gauge comprising a pivotal pointer, a dial with a graduated scale over which the pointer moves, an arbor for the pointer, an aneroid disk having a coaxial shank, an actuator with pintle ends, bearing levers engaging the actuator pintle ends and having capacity for differential adjustment, said actuator directly co-ordinating the aneroid disk with the pointer arbor to effect movement of the latter in one direction, a mounting frame embodying upper and lower flanges with means affording pivotal support for the bearing levers and in which the aforesaid parts are arranged in co-operative assemblage, said frame embodying lateral projecting tongues, a casing to receive the assemblage as a body and having a flaring lip, a crystal supported by the projecting tongues in spaced relation to the gauge dial, a retainer ring marginally lapping the crystal and gripping the casing lip to secure said parts together, the aforesaid projecting tongues by compression accommodating variations in thickness of the crystal. means in the casing co-operative with the mounting frame for preventing relative rotation between the assembled parts, and a clamping device whereby the gauge is secured in use, said device comprising a bridge stamping having the intermediate portion formed with stiffener flanges and a central aperture accommodating the shank of the aneroid disk, and said shank being externally screw-threaded to receive a lock nut.

12. A gauge comprising a counterbalanced pivotal pointer, a dial having a graduated scale over which the pointer moves and also provided with diametrically opposed cutouts, an arbor for the pointer, an aneroid disk responsive to pressure from within, an actuator with pintle ends, bearing elements co-operative with the actuator pintle ends and having capacity for differential adjustment, said actuator directly coordinating the aneroid disk and pointer arbor for movement in one direction, a mounting frame embodying upper and lower flanges with differential notches, affording pivotal connection for the bearing elements, and in which the aforesaid parts are arranged as an assembled co-operative body, said frame having inwardly converging slots providing projecting tongues and bearing spurs between which the dial is snapped, a casing for the assembled unit having a flaring lip, a crystal seating on the projecting tongues, means preventing relative rotation of the unit and casing, and a retainer ring marginally lapping the crystal and gripping the flaring lip to lock the entire assemblage permanently together.

13. In a gauge, a mounting member consisting of a metal stamping having an intermediate channeled-section with a central and spaced apertures, said member embodying coextensive flat flanges each of which is convergently slotted to provide bearing spurs with co-planar compressible tongues, and each said flange having differently positioned slots and notchings.

14. In a gauge, a clamping member consisting of a bridge-like sheet metal stamping, the web portion whereof is formed with a central bearing aperture and reinforcing lateral stiffener flanges extending the full length of said web portion.

15. A gauge comprising a pivotal pointer, a graduated dial overtravelled by the pointer, an arbor for the pointer, an actuator co-ordinated with the arbor of the pointer, a pressure-responsive device functional to move the actuator, and pivotally mounted bearing elements between which the actuator is journaled, said elements being adapted for relative movement in paralleling planes whereby the actuator may be circumferentially adjusted in two directions substantially at right angles to one another.

16. A gauge comprising a pointer, a co-ordinating dial over which the pointer moves, an arbor for the pointer, an actuator operatively connecting with the arbor, an aneroid disc device adapted to influence said actuator in effecting movement of the pointer in one direction, and pivotally mounted bearing levers between which the actuator is journaled and adapted for differential swinging movement in paralleling planes, one of said levers imparting arcuate movement to the actuator with respect to the aneroid axis and the other conoidally swinging the same.

17. In a gauge, an actuator unit consisting of a metal stamping configured to provide a bar portion having joggled ends constituting bearing pintles with a lateral tongue, said tongue being directed at an angle to the plane of said bar portion, and a medially-located arm co-planar with the bar portion, said arm having its free end relatively bent and forked.

18. In a gauge, a bearing member consisting of a sheet metal stamping centrally cut out along its major dimension to define an open-ended slot intermediate co-planar paralleling portions, each said portion being provided adjacent its free end with an integral relatively-upset claw.

In testimony whereof, I have hereunto signed my name at Philadelphia, Pennsylvania, this 22nd day of August, 1927.

JOSEPH P. REMINGTON.